United States Patent [19]

Benezech

[11] 4,182,027
[45] Jan. 8, 1980

[54] METHOD OF ASSEMBLING A MAGNETO ROTOR ASSEMBLY

[75] Inventor: Jacques Benezech, Le Vesinet, France

[73] Assignee: Novi-P.B., Pantin, France

[21] Appl. No.: 883,579

[22] Filed: Mar. 6, 1978

[30] Foreign Application Priority Data

Mar. 29, 1977 [FR] France .................. 77 09288

[51] Int. Cl.² ........................................ H02K 15/02
[52] U.S. Cl. ...................... 29/598; 29/525;
29/732; 156/297; 310/42; 310/153
[58] Field of Search ................. 29/598, 732, 525;
156/293, 297; 310/153, 156, 42, 45

[56] References Cited

U.S. PATENT DOCUMENTS

| 3,818,586 | 6/1974 | Harkness et al. .......... 29/598 |
| 3,861,028 | 1/1975 | Mittag ................... 29/598 |
| 4,101,371 | 7/1978 | Aggen .................. 29/598 X |

Primary Examiner—Carl E. Hall
Attorney, Agent, or Firm—Karl F. Ross

[57] ABSTRACT

A magneto rotor is formed of a hollow cup-shaped cylindrical drum adapted to be mounted on the flywheel of a combustion engine. A plurality of discrete cylindrically segmental permanent magnets are angularly equispaced about the interior of the drum and radially overlying the inner surface of each of these magnets is a magnetically permeable pole piece also of cylindrical segmental shape. The gaps between each of the inductors formed by a respective magnet and pole piece are filled by nonmagnetic holding blocks having lateral flanks tightly engaging the magnets and pole pieces. An adhesive tightly secures the magnets, pole pieces and blocks in the drum. The arrangement is assembled by fitting in the holding blocks and magnets and thereafter driving the pole pieces tightly in place between the holding blocks.

3 Claims, 7 Drawing Figures

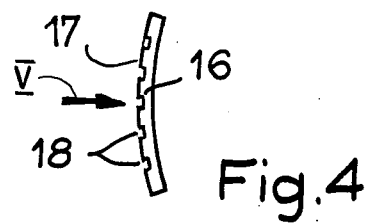
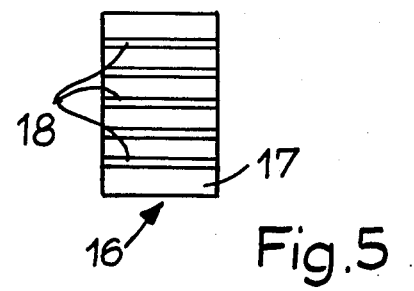
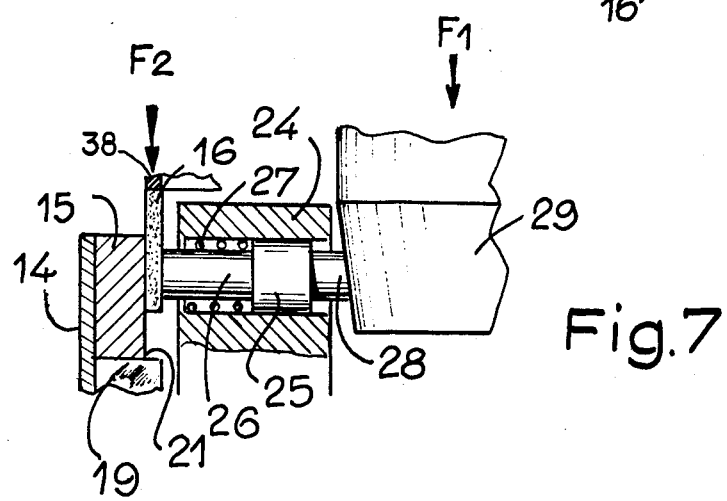
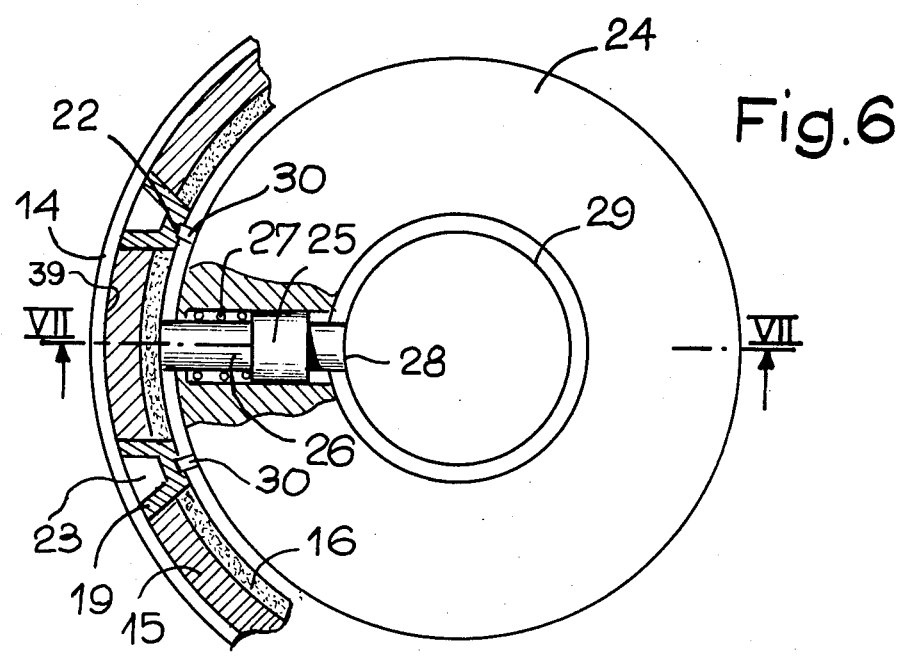

METHOD OF ASSEMBLING A MAGNETO ROTOR ASSEMBLY

FIELD OF THE INVENTION

The present invention relates to a magneto rotor of the type mounted directly on the flywheel of a small combustion engine. More particularly, this invention concerns such a rotor, a method of assembling same, and a tool for assembling same.

BACKGROUND OF THE INVENTION

A magneto rotor is known having a substantially cylindrical and cup-shaped drum having at one end a base plate formed with a central axial hole in which a hub is received and formed off set from this hole with a plurality of ventilating apertures. Inside the drum and angularly spaced about its cylindrical interior surface is a plurality of magnetic inductors each formed by a permanent magnet and a pole piece of high magnetic permeability.

In use the rotor described above is spun at high speed about its axis so that current can be generated in stationary coils juxtaposed with the inductors inside the drum. Such an arrangement is typically used on small combustion engines, as for instance in two-wheel vehicles for generating the electricity that powers the ignition and that operates the head and running lights of the vehicle.

Such an arrangement is subjected to considerable vibration and miscellaneous shocks, so that the inductors constituted by the magnets and the pole pieces must be extremely securely fixed inside the drum. Should one of the inductors come loose the inevitable result is almost immediate stoppage of the engine and destruction of the magneto assembly.

As the magnets are normally formed of a ceramic-like material such as ferrite it is extremely difficult to shape them, or to bore them out so as to make their mounting an easy task. Similarly, the very hard pole pieces, normally formed of steel, cannot be machined to exact specifications either without considerably increasing the cost of the magneto rotor.

It has been suggested in French Pat. No. 1,125,118 to hold the inductors in place by means of a cast aluminum cage which is adhesively secured in place with the inductors. Such an arrangement is completely satisfactory with relatively small magnetos, normally having less than four poles. However, it has been found to be of little use in larger assemblies where, for ventilation, it is necessary to separate the inductors considerably, so that the aluminum holding cage must be formed with such large spaces for ventilation that it has no strength and cannot serve its intended function.

OBJECTS OF THE INVENTION

It is therefore an object of the present invention to provide an improved magneto rotor.

Another object is the provision of an improved method of and tool for assembling such a rotor.

Yet another object is the production of a magneto rotor which can have a relatively large number of poles, yet which is extremely rigidly mounted together in a relatively simple manner.

SUMMARY OF THE INVENTION

These objects are attained according to the present invention in a rotor of the above-described general type but wherein the inductors each formed by a respective magnet and pole piece are separated and held in place by holding blocks, the entire assembly being held together by an adhesive. These holding blocks, according to this invention, are nonmagnetic but thermally conductive and have angularly directed side flanks that bear tightly on the side flanks of the advantageously cylindrically segmental magnets and pole pieces.

According to further features of this invention the entire device can be assembled by means of a tool having a support body that can fit with play inside the outer magnetically permeable drum. This support body is provided with a number of radially displaceable pushers each pressable against a respective pole piece when the support body is fitted into a partially assembled magneto rotor. According to this invention the support body is also provided with rails forming ridges that can fit into corresponding grooves on the holding blocks. Thus, the holding blocks can be positively positioned inside the drum by means of these ridges, whereupon the magnets can be slid axially into the drum. Finally, the pole pieces that each lie radially inside a respective magnet are also slid partly axially into the drum and then are forced all the way axially into place while simultaneously radially outwardly pressing the pole pieces. To this end the nonmagnetic holding blocks are made of a material that is much softer than the pole pieces so that when these pole pieces are forced in place they can dig into the slightly overdimensioned holding blocks and therefore form an extremely tight assembly. After such fitting-together the entire assembly can be potted in a synthetic-resin compound, such as of the epoxy type.

Thus it is possible to assemble the rotor according to this assembly without particularly carefully machining the magnets and pole pieces in advance. The pole pieces are normally of a very hard material so that forming the holding blocks of cast aluminum and overdimensioning them as described above makes it possible to force the entire assembly together, with only the holding blocks being deformed during the assembly. Subsequently applying an adhesive to the interfaces between all of the parts by spinning the rotor while introducing an adhesive into it ensures that the entire assembly will form a virtually monolithic block that will be extremely resistant to vibration and shocks. The various parts can be produced at relatively low cost since they need not be machined or cast to extremely close tolerances. Thus, not only is the assembly extremely durable in use, but can be produced relatively cheaply.

BRIEF DESCRIPTION OF THE DRAWING

FIG. 4 is an end view of a pole piece according to this invention;

FIG. 5 is a view taken in the direction of arrow V of FIG. 4;

FIG. 6 is an end view of a rotor and an assembly tool according to this invention; and FIG. 7 is a partial section taken generally along line VII—VII of FIG. 6.

SPECIFIC DESCRIPTION

Figure 1:
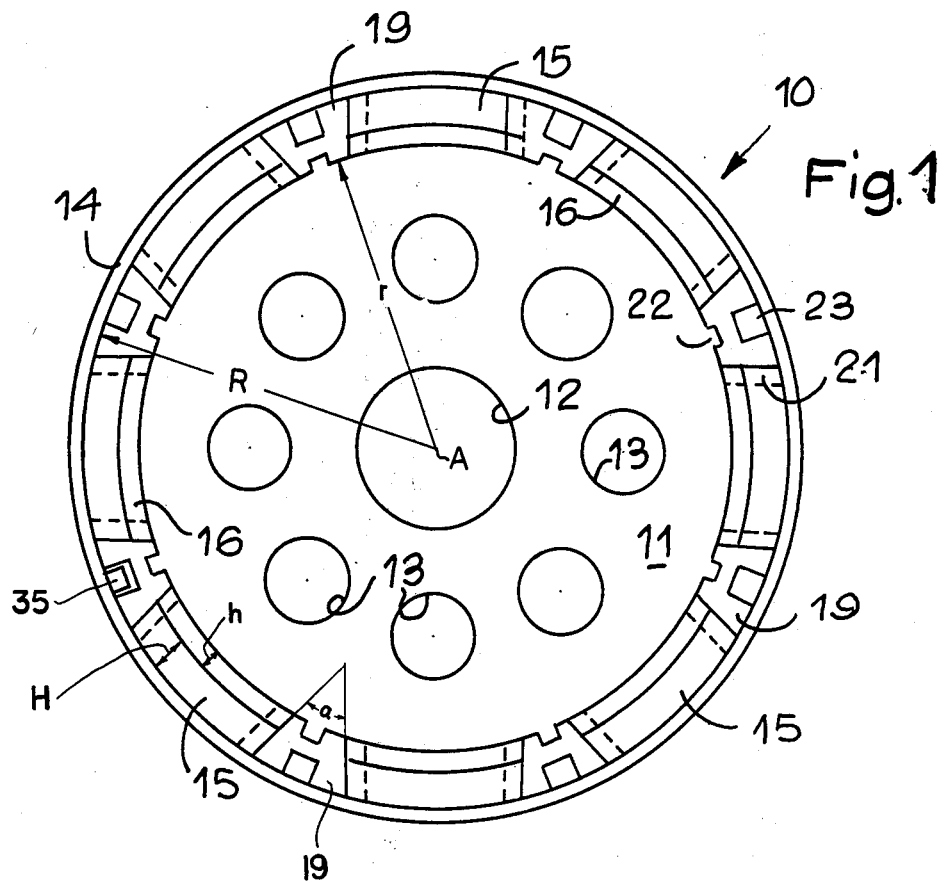
FIG. 1 is an end view of an assembled rotor according to this invention.

As shown in FIG. 1 a magneto rotor according to the instant invention is formed basically of a cup-shaped highly permeable steel drum 10 having a substantially flat end wall 11 formed with a central hole 12 and offset ventilation holes 13 and a cylindrical outer wall or rim 14 centered on an axis A. Angularly equispaced about the interior of this rim 14 are eight like cylindrically segmental ferrite permanent magnets 15 each having an outer face of a radius of curvature equal to the radius of curvature R of the inner surface of the rim 14 and an inner face of slightly smaller radius of curvature. In addition, each magnet has between its inner and outer faces a radial height or dimension H. The angularly directed planar and axially extending sides or edges of the magnets 15 are inclined apart toward the axis A so that the magnets 15 are somewhat outwardly tapered or wedge-shaped. Lying radially inside each magnet 15 is a geometrically congruent highly permeable steel pole piece 16 having a radial dimension h and an inner face of a radius of curvature r smaller than the radius of curvature R. Each magnet 15 forms with its respective piece 16 an inductor and both the magnets 15 and the pole pieces 16 are of the same axial length L (see FIG. 3). As shown in FIGS. 4 and 5 the outer face 17 of each of the pole pieces 16 is formed with a plurality of square-section axially extending grooves 18. The radius of curvature of this surface 17 which is exactly complementary to the confronting surface of the respective magnet 15 is greater than r and smaller than R.

Figure 2:
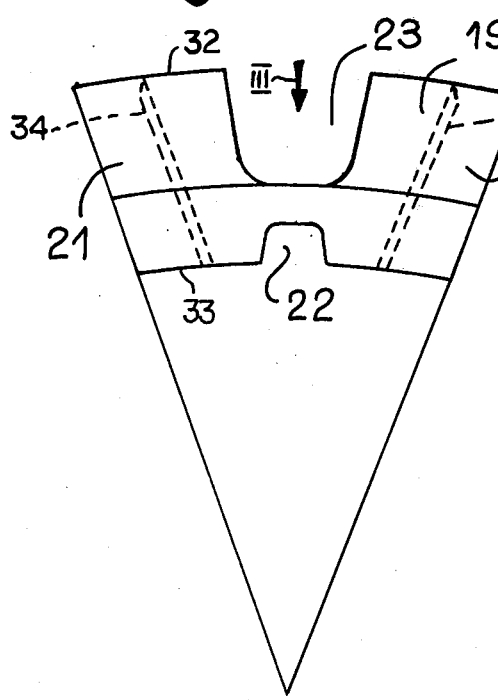
FIG. 2 is a large-scale end view of a holding block for a rotor according to this invention.
Figure 3:
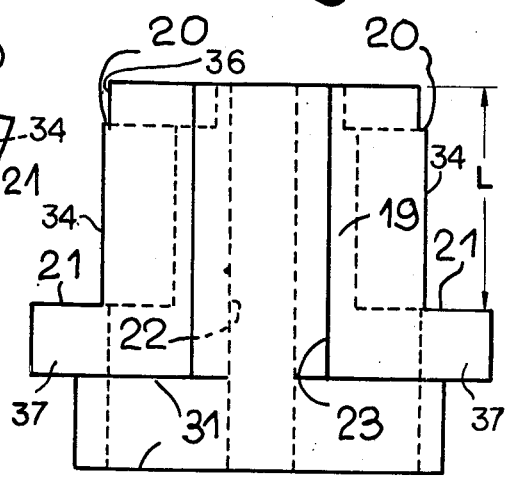
FIG. 3 is a view taken in the direction of arrow III of FIG. 2.

As also shown in FIGS. 2 and 3 each inductor formed by a respective magnet 15 and pole piece 16 is separated from the angularly flanking inductors by nonmagnetic, here cast-aluminum, holding blocks 19. Each such block has an inner face 33 of the radius of curvature r and an outer face 32 of the radius of curvature R. Furthermore, each such block 19 has a pair of axially extending outer edges or side flanks 34 which lie at an angle a of between 40° and 50° to each other. Each block 19 is formed at its one axial end at the surfaces 34 with a recess formed by a relatively shallow inset 36 defined by a relatively small shoulder 20. Furthermore, each side 34 is formed with an angularly projecting formation or flange 37 defining a relatively large shoulder 21 spaced by a distance equal to the length L from the opposite end of the respective block 19. To the other side of the flanges 37 each block 19 is formed with a cut back portion 31 that normally lies at the bead between the end plate 11 and side wall 14 of the drum 10. On its inner face 33 each block 19 is formed with an axially extending relatively small positioning groove 22 and on its outer face 32 with a relatively deep and wide axially extending groove 23. The cut away portion has a radially outer surface level with the base of the groove 23.

The rotor is assembled with a tool basically comprising a rectangular-section annulus 24 of an outer diameter slightly smaller than $2r$. Eight angularly equispaced pistons 25 are received in respective radially extending bores in the ring 24. Each such piston 25 carries on its radially outer side a pusher rod 26 and on its radial inner side a force-receiving rod 27. A return spring 17 normally biases the entire pusher assembly 25, 26 and 28 radially inwardly. Inside the tool a large actuating element has a frustoconical end 29 engageable with the beveled inner ends of the formations 28. In addition, on its outer periphery the ring 24 is provided with eight angularly equispaced rails 30 constituting axially extending ridges receivable within the grooves 22 as will be described below. Finally, the tool includes a cylindrical pusher sleeve 38 of an inner diameter equal to $2r$.

To assemble the rotor of FIG. 1, first the ring 24 with the actuating element 29 out of contact with the formations 28 is centered inside the empty cup-shaped drum 10. The holding blocks 19 are then slid in place between each of the rails 30 and the inner surface of the drum wall 14. These rails 30 will therefore hold the blocks 19 in almost the exact position they will be in in the finished assembly. Thereafter the eight magnets 15 are slid axially in place between the holding blocks 19.

The relatively hard pole pieces 16 are then slid axially into place on top of each of the magnets 15. This cannot be accomplished in one operation since the holding blocks 19 are somewhat overdimensioned so that the pole pieces 16 can fit in at the cut away portion 36 so that unless forced they will merely rest against the shoulders 20 and will not be easily movable axially past these shoulders 20. A relatively small force in the direction of arrow $F_1$ is exerted on the member 29 during this initial fitting operation when the ends of pole pieces 16 are positioned axially against the shoulder 20. Thereafter the force in the direction $F_1$ is increased somewhat and the ring 38 is brought axially to bear on all of the pole pieces 16 with a considerable force in the direction of $F_2$. This pushes the pole pieces axially toward the shoulders 21 and radially outwardly. As the pole pieces 16 are made of hard steel and the holding blocks only of cast aluminum, this will cause the pole pieces 16 to dig into the holding blocks 19 at the outer sides 34 thereof between the shoulders 20 and 21 until the pole pieces 16 come to rest flatly against the projections 37 at the shoulders 21. This ensures an extremely tight fit between these parts, using the very hard pole pieces 16 effectively to machine the relatively soft holding blocks 19.

Thereafter the thus assembled rotor is rotated at relatively low speed and a synthetic-resin adhesive, preferably of the epoxy type, is poured into it so that it will automatically centrifugally distribute itself over the inner surface to form an adhesive layer 39 that extends between all of the interfaces of the magnets 15, pieces 16 and blocks 19.

Thereafter the rotor is spun at relatively high speed to further drive the adhesive into all of the interfaces. Any unbalances can be cured at this time by placing weights such as shown at 35 in FIG. 1 into the grooves 23. Such weights will of course be secured in place by the layer 39 of adhesive.

Such a rotor can be used in conjunction with a multipolar stator such as described in the copending, commonly owned, and jointly filed application Ser. No. 883,580 whose entire disclosure is herewith incorporated by reference.

The rotor according to the instant invention therefore once assembled is extremely securely held together. The metal-to-metal contacts between the pole pieces 16 and holding blocks 19 ensures that the assembly virtually constitutes an integral block, so that excellent conduction of heat through the holding blocks and from the pole pieces to the drum 14 is ensured. At the same time the magnet 15 and pole pieces 16 need not be meticulously machined so as to fit together as slight overdimensioning of the holding blocks 19 compensates for any variations in the dimensioning of these elements.

I claim:

1. A method of assembling a rotor comprising when assembled:
   a hollow drum having a substantially cylindrical interior surface centered on an axis,
   a predetermined number of discrete segmental magnets lying on said surface inside said drum and angularly equispaced about said axis,
   a like number of magnetically permeable pole pieces each of the same angular dimension as a respective magnet and each lying radially inside a respective magnet, and
   a like number of nonmagnetic holding blocks interleaved between said magnets and pole pieces and each having a radial dimention substantially greater than the radial dimension of the respective magnets, said pole pieces being substantially harder than said blocks,
   said method comprising the steps of sequentially:
   positively positioning said holding blocks in said drum at angularly equispaced locations;
   axially fitting said magnets into said drum between said holding blocks;
   axially sliding said pole pieces between said holding blocks and radially inside said magnets while simultaneously radially outwardly pressing said pole pieces against said magnets so that said pole pieces dig into said holding blocks.

2. The method defined in claim 1, further comprising the step after sliding said pole pieces of rotating said drum with said blocks, pieces, and magnets about said axis and simultaneously introducing a fluid adhesive into said drum and centrifugally forcing said adhesive between said drum, pieces, blocks, and magnets.

3. The method defined in claim 2 wherein said pole pieces have radially outer faces formed with axially extending grooves, said adhesive flowing into said grooves of said outer faces between said pole pieces and said magnets.

* * * * *